No. 649,569. Patented May 15, 1900.
T. V. COX.
APPARATUS FOR MAKING CONFECTIONERY.
(Application filed Oct. 20, 1899.)

(No Model.) 4 Sheets—Sheet 1.

Witnesses:
C. L. Belcher
M. J. Ludlow.

Inventor
Thomas V. Cox
By Townsend & Decker
Attorneys

No. 649,569. Patented May 15, 1900.
T. V. COX.
APPARATUS FOR MAKING CONFECTIONERY.
(Application filed Oct. 20, 1899.)
(No Model.) 4 Sheets—Sheet 2.
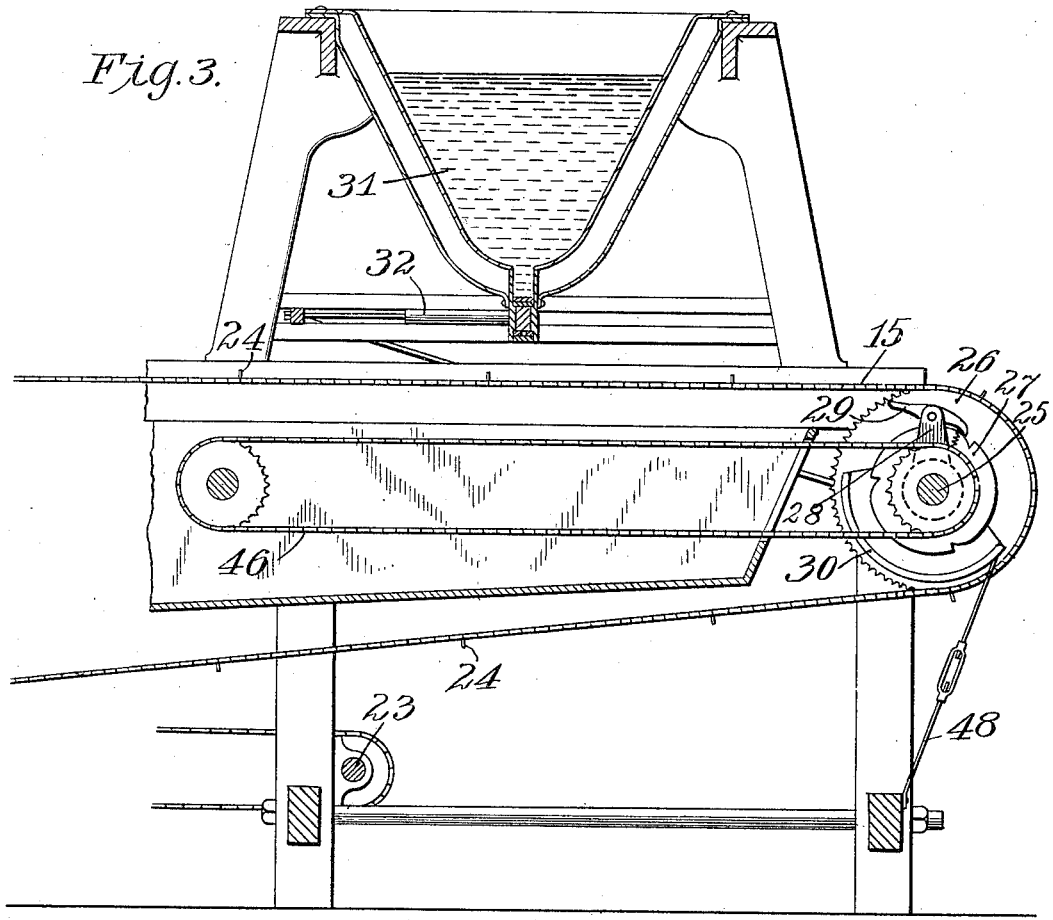
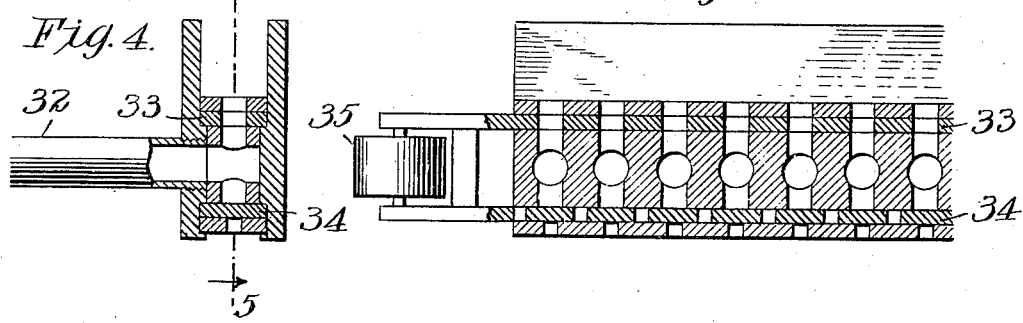
Witnesses
C. L. Belcher
M. J. Ludlow
Inventor
Thomas V. Cox
By
Townsend & Decker
Attorneys No. 649,569. Patented May 15, 1900.
T. V. COX.
APPARATUS FOR MAKING CONFECTIONERY.
(Application filed Oct. 20, 1899.)
(No Model.) 4 Sheets—Sheet 3.

Witnesses:
C. L. Belcher
M. J. Ludlow

Inventor
Thomas V. Cox
By Townsend + Decker
Attorneys

No. 649,569. Patented May 15, 1900.
T. V. COX.
APPARATUS FOR MAKING CONFECTIONERY.
(Application filed Oct. 20, 1899.)
(No Model.) 4 Sheets—Sheet 4.
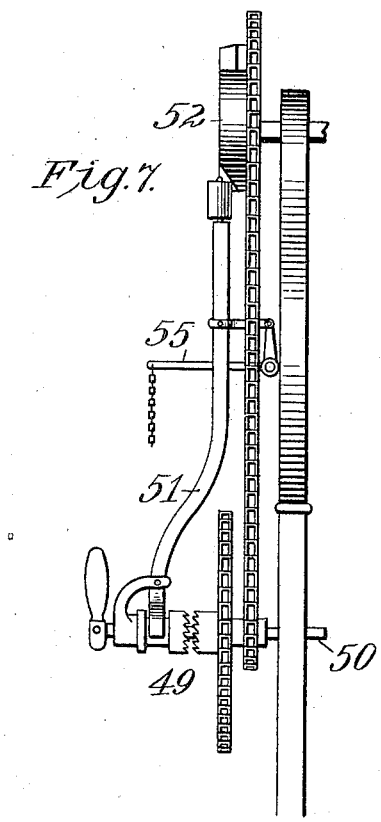
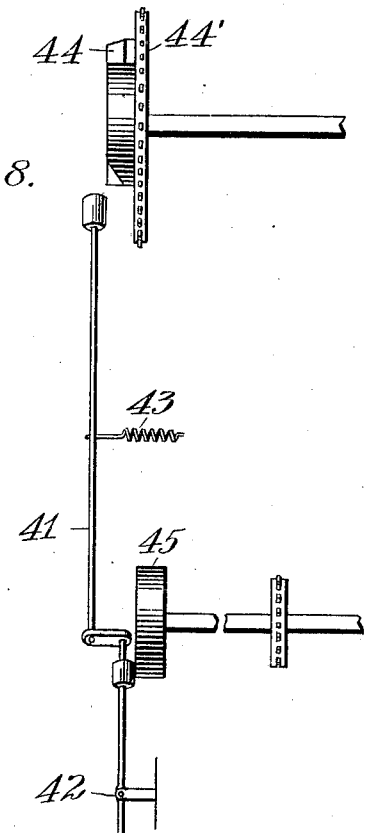
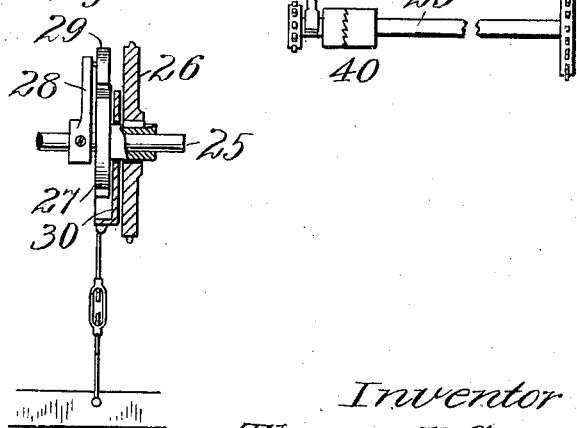
Witnesses:
C. L. Belcher
M. J. Ludlow
Inventor
Thomas V. Cox
By
Townsend & Decker
Attorneys

UNITED STATES PATENT OFFICE.

THOMAS V. COX, OF NEW YORK, N. Y.

APPARATUS FOR MAKING CONFECTIONERY.

SPECIFICATION forming part of Letters Patent No. 649,569, dated May 15, 1900.

Application filed October 20, 1899. Serial No. 734,166. (No model.)

*To all whom it may concern:*

Be it known that I, THOMAS V. COX, a citizen of the United States, and a resident of the city of New York, borough of Brooklyn, in the county of Kings and State of New York, have invented certain new and useful Improvements in Apparatus for Making Confectionery, of which the following is a specification.
This invention relates to an improvement in apparatus for making confectionery, and particularly to such apparatus designed for molding small goods.

The principal object of the invention is the production of an apparatus or machine which will combine the functions of a "starch-machine," a "printer" or mold-making apparatus, and a mold-filling device or depositing-machine, and which combined apparatus shall be controlled in its cycle of operations by the depositing-machine and the printer.

Another object of the invention is the construction of a mold-filling machine or depositor that will readily fill at one discharge an entire tray or set of molds consisting of several rows having several molds in each row.

The invention consists in the construction, combination, and arrangement of parts and mechanisms substantially as hereinafter fully set forth and claimed.

Figure 1:
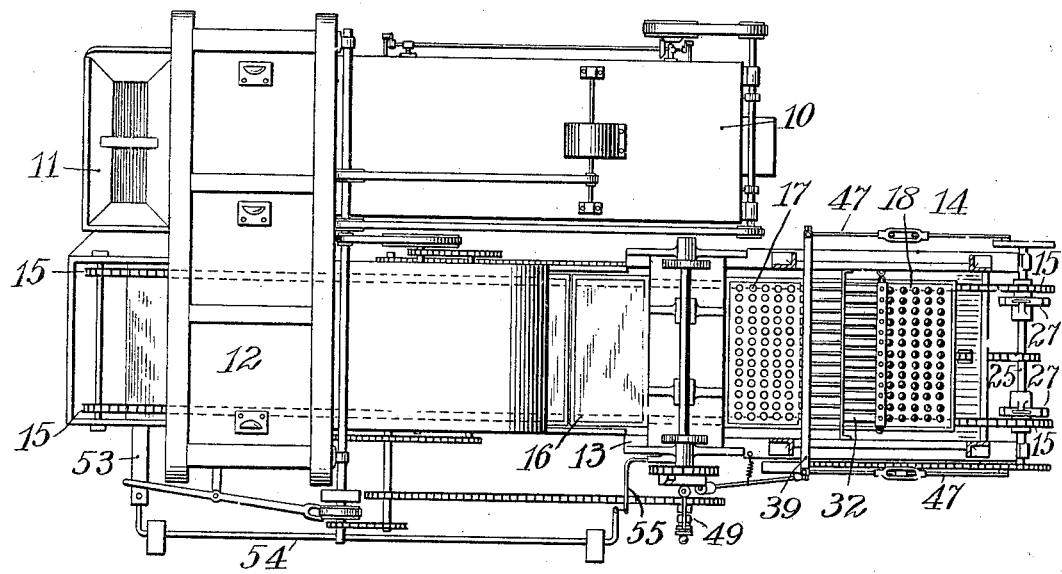
Figure 2:
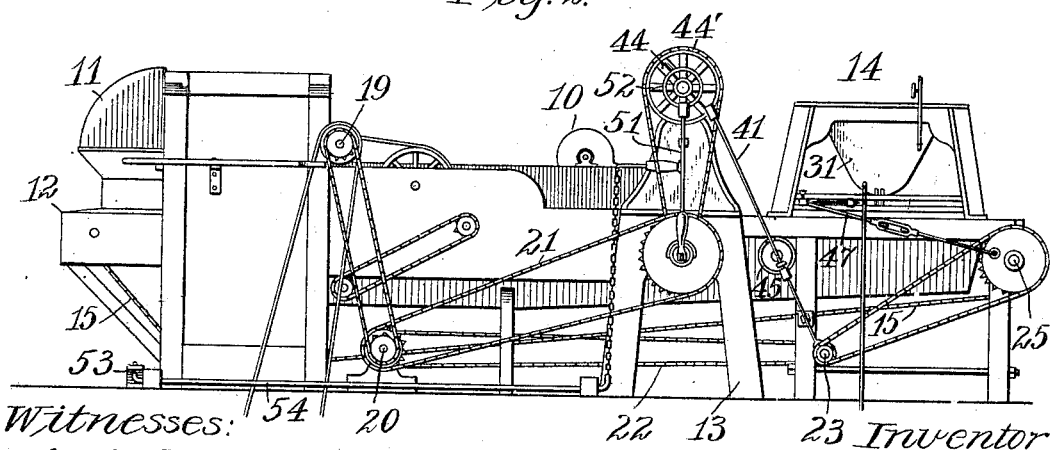
Figure 6:
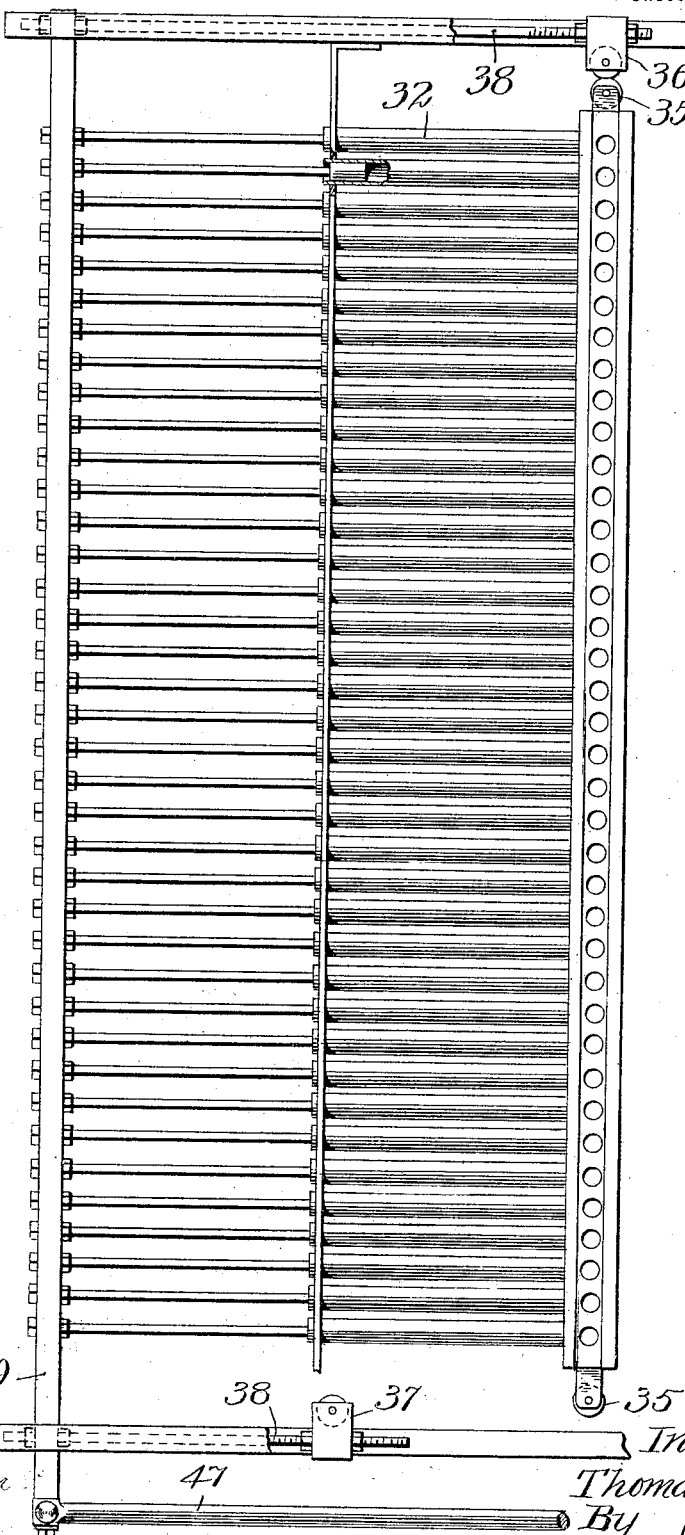

In the accompanying drawings, which form a part of this specification, Figure 1 is a plan of the improved apparatus. Fig. 2 is a side elevation thereof. Fig. 3 represents on an enlarged scale a vertical section through the depositing-machine. Figs. 4 and 5 are sectional views of a portion of the depositing-machine, the section in Fig. 5 being taken in the plane indicated by the line 5 5 in Fig. 4.
Fig. 6 is a plan of the pumps employed in the depositing-machine. Fig. 7 is a detail view showing the controlling mechanism actuated by the printer. Fig. 8 is a similar view showing the automatic controlling mechanism for the depositor. Fig. 9 is a detail of a portion of the depositor.

In Figs. 1 and 2 that portion of the apparatus designed as the "starch-machine" is indicated by the numerals 10, 11, and 12.
That portion of the apparatus termed the "printer" is indicated at 13, while the "depositor" is represented at the right of the printer and is indicated by the numeral 14.

I lay no claim to the starch-machine nor to the printer individually, since they are not of my invention, nor to the broad idea of operating them in unison; but the control of the whole in series by the depositor and the printer is of my invention. In describing the apparatus only so much of the starch-machine and printer will be specified as is necessary to give a clear understanding of the combination and the coöperation of the depositor therewith whereby this control is effected.

In operating the starch-machine trays of starch containing confections which have been molded therein are emptied into the hopper at 11. The confections are then separated from the starch and pass out at the end of the machine indicated by 10, while the starch is carried into the portion of the machine indicated by 12. Additional starch may be added when necessary. In this portion of the machine the empty trays are placed by the operator upon endless carrier-chains 15, where they are filled with said starch as they progress intermittently through the machine. They make their exit from the machine, as indicated at 16, where a full tray is shown about to enter the printer. In the printer impressions or molds are made in the starch, into which the "mass" is subsequently to be run or deposited. One of said trays so printed is indicated at 17, and is on its way into the depositor. As it passes through the depositor the mass is run into the molds and the entire tray filled by one discharge. Such tray is indicated at 18 as about to issue from the depositor, whence it will be taken to the drying-room. Thus the combined apparatus performs a cycle of operation.

The power for driving the entire apparatus may be derived from any suitable source and is preferably applied to the shaft 19, thence it is transmitted to the counter-shaft 20, from which by chain 21 the printer is run, while from the same counter-shaft by means of chain 22 power is transmitted to the shaft 23 of the depositor. The endless chains 15 traverse the three combined machines and are preferably provided with cleats or spurs (indicated in Fig. 3 at 24) for insuring a positive progression of the trays.

The depositing-machine is provided with a hopper, as 31, (omitted in Fig. 1,) for holding the mass that is to be run into the molds. This hopper is preferably provided with a steam-jacket for keeping the mass hot. In the bottom of the hopper is a strip or bar perforated with vertical discharge-ports, and these ports are provided with lateral openings, to each of which is fitted a pump 32. A gate or slide, as 33, is located above these perforations and is drawn to allow the mass to flow to the pumps, which are filled thereby as their pistons are drawn back. When the requisite amount of mass has entered the pumps, the gate 33 is closed and a gate, as 34, at the lower ends of the peforations is opened. Then as the pistons of the pumps are advanced the mass in the pumps issues to the molds.

Obviously the pumps may be omitted and the mass allowed to run directly to the molds. This would require that an even pressure be kept upon the mass in the tank, either by maintaining a constant level of the mass or by increasing the pressure as the mass decreases. The pumps, however, are found to be the preferable means for insuring a perfect and uniform flow of the mass from the hopper to the molds.

The movement of the gates 33 and 34 is simultaneously effected by joining them together at the ends and arranging suitable tappets for operating them as the pistons of the pumps are reciprocated. For this purpose there is preferably mounted between the ends of the gates suitable rollers, as 35, with which tappets, as 36 37, may engage. These tappets are mounted in guides at the sides of the machine and are reciprocated with the pistons by being connected through the rods 38 with the draw-head 39, to which all the pistons are connected, and which is also guided in the same ways as are said tappets. The face of these tappets that engages the rollers 35 is preferably provided with a roller, as shown. In Fig. 6 one tappet 36 is shown engaging roller 35 at one end of the gates, which have thereby been moved, so as to open the lower gate and close the upper one. Then when the pistons reach the other end of their stroke the other tappet 37 engages the opposite roller 35 and reverses the position of the gates, so that the pumps may again fill as their pistons are returned. The tappets, as seen in Fig. 6, are adjustable upon the rods 38, so as to regulate the time of opening and closing the gates.

The operation of the depositor is intermittent in order that sufficient time be allowed for the action of the printer and to insure the proper filling of the trays with starch. This intermittent operation is preferably controlled directly by the printer and may be effected in many ways. In the drawings there is shown a clutch at 40 on the shaft 23, the operating-lever for which is seen at 41 and is pivoted at 42. The lever normally holds the clutch out of engagement through the action of a spring, as indicated at 43. The clutch is operated through the lever being forced outwardly at its upper end by a cam or projection 44 on the sprocket-wheel 44', fixed to the upper shaft of the printer. The clutch is then maintained closed by means of the ring-cam 45. This cam is rotated by a chain 46, driven from the shaft 25. In the rim of the cam is a notch from which a roller on the clutch-lever 41 is lifted when said lever is actuated by the cam 44. The depositor operates until said roller again falls into said notch. During this operation of the depositor the trays have been advanced the width of one of them and one of them has been filled while advancing. The filling was effected by the forward movement of the pistons, the draw-head connected thereto being actuated through the pitman 47, driven from the shaft 25. As soon as a tray is filled the procession of trays must stop and stand still while the pumps are refilling. This intermittent action of the trays is also under the direct control of the depositing-machine, and for that purpose said machine is provided with suitable starting and stopping mechanism for the carrier-chains. One form of mechanism for effecting this intermittent motion is illustrated, the details of which are to be found in Figs. 3 and 9. Upon the shaft 25, which carries the sprockets 26 for the endless chains, are mounted the three-teeth ratchet-wheels 27, each of which is rigidly attached to the proximate sprocket-wheel 26, as by keying the latter upon the hub of the former, as seen in Fig. 9. Then upon the shaft 25 there are arms, as 28, to which are pivoted the pawls 29, that engage the teeth of the ratchet-wheels 27. Suitable means are provided for tripping these pawls in a manner such that they will engage their respective ratchet-wheels for only the period necessary to advance the trays while one of them is filling with the mass. One form of tripping device for this purpose is seen at 30, and consists of a flanged sector journaled upon the hub of each ratchet-wheel 27 and held against rotation by the rod 48, the flange being at such a distance from the center of shaft 25 as to engage the tail of the pawl 29 and hold said pawl out of engagement with the ratchet-wheel during a portion of the revolution of shaft 25. It is in this interval that the pistons make their return movement and the trays stand still.

The position of the tripping-sectors may be changed to regulate the time for tripping the pawls 29 and for holding them out of engagement with the ratchet-wheels. For this purpose the rod 48 is provided with a turnbuckle, as shown. Turnbuckles or other suitable adjusting means are also provided in the pitman 47 for regulating the stroke of the pistons, and thereby gaging the amount of mass that shall flow for each tray.

As has been stated above, the trays are filled while in motion, and each discharge of mass from the gang of pumps is sufficient to fill an entire tray. The mass to operate thus must be in a fluid condition—such, for instance, as a gum or licorice mass, which when hot flows freely. Each stream of the mass as it is discharged by its respective pump fills the several molds in the transverse line of the tray then passing under the discharge-port of that pump, and so with every pump of the gang and every transverse line of molds in each tray. The movement of the tray and the discharge of the pumps are so timed that the beginning of each stream strikes the first mold in each transverse line, and as the tray is advanced each stream is stretched out, as it were, over its respective line and subdivides between the several pits or molds in that line. As the mass does not cling at all to the starch, this subdivision takes place readily over the walls of starch between adjacent pits or molds.

By attaching the pumps to the hopper in the manner shown and described it is possible to get them as close together as it is practicable or to make the discharge-ports in the bottom of the hopper or as it is to construct the molds in a tray of starch. This close arrangement of pumps provides for molding a greater number of small confections in a given time than has heretofore been done. This also, in connection with the filling of each entire transverse row of molds in a tray by one discharge of the pumps, multiplies the capacity of the depositor and of the combined apparatus to an extent never before approximated.

The combined apparatus may be run continuously, starch with or without the confectionery previously molded therein being fed into the hopper at 11 and empty trays being placed on the endless chains in the part 12 and the tray containing the freshly-run confectionery being taken from the apparatus at the end of the depositor, the cycle of movements of the depositor and the movements of the endless chains while the trays are filling with starch, while the molds are formed therein, and while said molds are filling being automatically controlled and regulated by the printer and depositor and their appurtenances.

The means for automatically stopping the printer and depositor after filling the molds of each tray consist of a clutch, as 49, upon the shaft 50, a lever 51 for operating the clutch, and a ring-cam 52 on the upper shaft of the printer coöperating with said lever. A roller upon the upper end of the lever rests in the notch of this cam when the clutch is disconnected. To start the printer, the clutch must be thrown in, and this act throws the upper end of the lever 51 out onto the rim of the cam, where it will ride until the notch thereof comes around again and admits the end of said lever, thereby disengaging the clutch. Any suitable means may be employed to throw this lever—as, for example, the treadle 53, which turns the rock-shaft 54, to the opposite end of which is connected a rock-shaft 55, that is in turn linked to the lever 51, as clearly shown in Fig. 7.

The depositor may be used independently of the rest of the apparatus, the printed trays or molds being prepared and fed to it; but it is preferably used in the combination shown, wherein each starch-filled tray is carefully printed by having formed in its surface the molds of the shape desired for the confectionery. Then just as the printing is completed the lever 41 is tripped, the clutch 40 closed, and the cam 45 released. The pawls 29 then engage with the ratchets 27 and the trays advance, and as a printed tray passes under the hopper the pumps force the mass in streams down upon it, which streams divide themselves between the molds of each transverse row in the tray, as above specified. Just as the tray has reached its limit—namely, the position at which the end of each stream of mass will fill the last mold in the respective transverse series—the cut-off is operated by the tappet 37 and the mass ceases to flow. At this instant also the pawls 29 are tripped by the flanged sector 30 and the procession of trays ceases to move. The lever 41 then falls into the notch of cam 45 and opens the clutch 40. The printer, however, continues to run until another tray is printed, when the above cycle of movements is repeated.

Obviously the cut-off could be operated for each longitudinal line of molds in a tray, and therefore each pump would drop just enough mass at a time to fill an individual mold. This, however, would be a very slow process and need only be employed in handling masses that cannot be reduced to a liquid state—such, for instance, as cream masses.

Many changes in the details of operation and in the formation of parts and their arrangement and association may be made without departing from this invention.

I claim as my invention—

1. In an apparatus for molding confectionery, the combination of endless chains traversing a starch-machine wherein mold-trays carried by said chains are filled with starch, thence traversing a printer wherein molds are formed in the starch of each tray, thence traversing a depositor wherein the molds in the trays are filled with mass, and means controlled by the printer for automatically stopping the printer the depositor and the said chains after each tray of molds is filled.

2. In an apparatus for molding confectionery, the combination of endless chains traversing a starch-machine wherein mold-trays carried by said chains are filled with starch, thence traversing a printer wherein molds are formed in the starch of each tray, thence traversing a depositor wherein the molds in the trays are filled with mass, and means controlled jointly by the printer and depositor for stopping the latter between the filling of successive trays to permit the printing of a tray.

3. In an apparatus for molding confectionery, the combination of endless chains traversing a starch-machine wherein mold-trays carried by said chains are filled with starch, thence traversing a printer wherein molds are formed in the starch of each tray, thence traversing a depositor wherein the molds in the trays are filled with mass, and means controlled jointly by the printer and depositor for permitting the movement of the mold-trays while the molds are filling.

4. In an apparatus for molding confectionery, the combination of endless chains traversing a starch-machine wherein mold-trays carried by said chains are filled with starch, thence traversing a printer wherein molds are formed in the starch of each tray, thence traversing a depositor wherein the molds in the trays are filled with mass, and means controlled jointly by the printer and depositor for holding the trays of starch still while one is being printed and while other trays are filling within the starch-machine.

5. In an apparatus for molding confectionery, the combination of endless chains traversing a starch-machine wherein mold-trays carried by said chains are filled with starch, thence traversing a printer wherein molds are formed in the starch of each tray, thence traversing a depositor wherein the molds in the trays are filled with mass, and means for preventing the movement of the trays while they are filling with starch and while a tray of starch is being printed and means for effecting the movement of the trays while the depositor is discharging into the molds.

6. In an apparatus for molding confectionery, the combination of endless chains traversing a starch-machine wherein mold-trays carried by said chains are filled with starch, thence traversing a printer wherein molds are formed in the starch of each tray, thence traversing a depositor wherein the molds in the trays are filled with mass, and means for stopping the chains with their trays while the printer is making an impression in one of the trays and means for moving the trays while the depositor is filling one of them.

7. In an apparatus for molding confectionery, the combination of endless chains traversing a starch-machine wherein mold-trays carried by said chains are filled with starch, thence traversing a printer wherein molds are formed in the starch of each tray, thence traversing a depositor wherein the molds in the trays are filled with mass, and means conjointly controlled by the printer and depositor for effecting the printing and depositing operations successively for the purpose specified.

8. In an apparatus for molding confectionery, the combination of endless chains traversing a starch-machine wherein mold-trays carried by said chains are filled with starch, thence traversing a printer wherein molds are formed in the starch of each tray, thence traversing a depositor wherein the molds in the trays are filled with mass, and means in the depositor for effecting the intermittent movement of the endless chains for the purpose specified.

9. In an apparatus for molding confectionery, the combination of endless chains traversing a starch-machine wherein mold-trays carried by said chains are filled with starch, thence traversing a printer wherein molds are formed in the starch of each tray, thence traversing a depositor wherein the molds in the trays are filled with mass, a cam on a shaft of the printer controlling the starting of the depositor, and the movement of said chains, and another cam on said shaft for stopping the printer.

10. In an apparatus for molding confectionery, the combination of endless chains traversing a starch-machine wherein mold-trays carried by said chains are filled with starch, thence traversing a printer wherein molds are formed in the starch of each tray, thence traversing a depositor wherein the molds in the trays are filled with mass, a clutch-lever for applying power to the depositor, a cam on the printer for operating said lever to close the clutch and a cam on the depositor for holding said clutch closed for a limited period.

11. In an apparatus for molding confectionery, the combination of endless chains traversing a starch-machine wherein mold-trays carried by said chains are filled with starch, thence traversing a printer wherein molds are formed in the starch of each tray, thence traversing a depositor wherein the molds in the tray are filled with mass, a clutch-lever for applying power to the depositor, a cam on the printer for operating said lever to close the clutch, a cam on the depositor for holding said clutch closed for a limited period and ratchet-and-pawl mechanism in the depositor for effecting the movement of the endless chains during a portion of said period.

12. A confectionery-molding machine having one or more discharge-ports and adapted to automatically discharge one or more streams of mass upon a set of molds, and having means for producing relatively-progressive movement between said discharge-ports and said molds while the mass is flowing, whereby there is effected a division of each individual stream between several successive pits or molds.

13. In an apparatus for molding confectionery, means for moving a set of molds comprising several lines of two or more molds each, and a depositor adapted to fill all the molds in the set while said set is moving.

14. In an apparatus for molding confectionery wherein there is a set of molds comprising several lines of two or more molds each, a depositor provided with discharge-ports and means for producing a relative movement between said discharge-ports and said set of molds whereby all the molds of the set will be filled at one discharge of the depositor.

15. In an apparatus for molding confectionery means for moving a set of molds and a depositor for filling the molds of said set while the latter is in motion.

16. In an apparatus for molding confectionery, means for moving a set of molds consisting of one or more rows of pits or molds and a depositor for filling at one discharge and in succession the molds in each of said one or more rows.

17. In a depositing-machine, the combination with vertical discharge-ports, of means for moving mold-trays horizontally under said ports, and means for effecting a discharge of mass from said ports while a tray is passing under them.

18. In a depositing-machine, the combination with mass-discharge ports, of endless chains for moving mold-trays past said ports and means for effecting a discharge of mass while each tray is in transit.

19. In a depositing-machine the combination with mass-discharge ports, of means for moving mold-trays past said ports, pumps for effecting a discharge of mass from said ports sufficient to fill an entire tray at one discharge and means for effecting the movement of the trays during the discharge and for stopping them at the end of the discharge, for the purpose set forth.

20. In a depositing-machine, the combination with mass-discharge ports of endless chains for moving mold-trays past said ports, means for effecting an intermittent discharge from said ports, and the ratchet-and-pawl mechanism for effecting the movement of said chains during the discharge and the cessation of said movement between discharges.

21. In a depositing-machine, the combination with a mass-reservoir having a series of discharge-ports, of a gang of pumps each communicating with a discharge-port and arranged parallel with one another exteriorly of said reservoir and to one side thereof, a draw-head extending transversely of the gang of pumps and connected to each pump-piston, and means for controlling the flow of mass from the discharge-ports.

22. In a confectionery-molding apparatus, the combination with a mass-reservoir having one or more perforations in its bottom through which the mass may flow, of means for moving under said reservoir, and transversely to said perforations during the flow of mass therefrom, a set of molds comprising one or more lines of several molds each, and means for automatically starting and stopping the flow of mass into the molds and means for starting and stopping simultaneously therewith the movement of the set of molds.

23. In a confectionery-molding apparatus, the combination with a mass-reservoir having one or more perforations in its bottom, of a pump for each perforation arranged exteriorly to the reservoir, a cross-head to which the piston of each pump is connected, gates controlling the entrance and exit of each pump and tappets actuated by said cross-head to reciprocate said gates at the ends of the throw of each piston.

24. In a confectionery-molding machine, the combination with a mass-reservoir having a row of discharge-ports leading therefrom, gates at either end of said ports, a pump for each port connected thereto between said gates, a cross-head to which all the pistons of said pumps are connected, ways for guiding said cross-head, and tappets connected to said cross-head and also guided in said ways, said tappets being so located and adjusted as to reciprocate said gates in unison with the reciprocations of the pistons, for the purpose set forth.

25. In a confectionery-molding machine, the combination with a mass-reservoir, of a series of pumps for discharging the mass therefrom intermittently, endless chains for moving mold-trays past the exits of said pumps, a power-driven shaft, ratchet mechanism connected thereto for intermittently moving said chains and trays, and a reciprocating connection between said shaft and the pistons of said pumps, the ratchet mechanism and said reciprocating connection operating to move the trays and discharge the pumps at the same time.

26. In a confectionery-molding machine, the combination with a power-shaft, of chain-wheels idle thereon, endless chains passing over said wheels for moving mold-trays through the machine, ratchet-wheels secured to the chain-wheels, operating-pawls secured to said shaft for driving said ratchet-wheels, and tripping devices for said pawls whereby the ratchet-wheels and chains are allowed to move only intermittently for the purpose set forth.

27. In a confectionery-mold-filling machine, the combination with mold-trays having several series or lines of molds extending lengthwise of the trays, of intermittently-operating mechanism for moving the mold-trays their full breadth at each movement, a mass-reservoir having a series of outlets extending the entire length of a tray and under which the molds of each series pass, and means for automatically starting and stopping the flow of mass from said outlets simultaneously at the starting and stopping of the trays.

28. In a confectionery-mold-filling machine, the combination with endless chains for moving the molds, of pumps for filling the molds, driving mechanism for said pumps and ratchet mechanism for intermittently connecting and disconnecting the driving mechanism for said chains and said pump-driving mechanism, for the purpose set forth.

29. In an apparatus for making confectionery, the combination with a series of intermittently-moving trays, of means for filling them with starch, means for automatically printing or forming all the molds in each tray at one act and means for automatically depositing mass in all the molds of each tray at one act and while the trays are in motion, said printing and depositing being done successively.

30. In an apparatus for making confectionery, the combination with means for moving mold-trays therethrough, of mechanism for forming molds in said trays, a depositor for filling such molds provided with a clutch, a lever for throwing the clutch, a cam actuated by the mold-forming mechanism for operating said lever to start the depositor, a stop-lever, and a second cam actuated by the mold-forming mechanism for operating the stop-lever to stop the action of the combined apparatus.

Signed at the borough of Manhattan, in the city of New York, county of New York, and State of New York, this 18th day of October, A. D. 1899.

THOMAS V. COX.

Witnesses:
C. L. BELCHER,
D. H. DECKER.